(12) United States Patent
Jackman et al.

(10) Patent No.: US 6,206,479 B1
(45) Date of Patent: Mar. 27, 2001

(54) HUB CENTRIC TRUCK WHEEL CAP AND SPACER APPARATUS AND METHOD OF USING SAME

(75) Inventors: Douglas S. Jackman, Garden Grove; Russell S. Fuller, Huntington Beach; Corey Kiesel, Temecula, all of CA (US)

(73) Assignee: Coyote Enterprises, Inc., Anaheim, CA (US)

(*) Notice: Subject to any disclaimer, the term of this patent is extended or adjusted under 35 U.S.C. 154(b) by 0 days.

(21) Appl. No.: 09/328,556

(22) Filed: Jun. 9, 1999

(51) Int. Cl.[7] .................................................. B60B 27/00
(52) U.S. Cl. ........................................................ 301/108.1
(58) Field of Search ......................... 301/108.1, 35.63, 301/35.58, 35.55, 111, 37.21, 115, 108.5; 403/13

(56) References Cited

U.S. PATENT DOCUMENTS

| | | | |
|---|---|---|---|
| 840,172 | * 1/1907 | Summers | 301/108.1 |
| 1,039,331 | 9/1912 | Stutzman . | |
| 1,467,740 | 9/1923 | Thompson . | |
| 1,657,588 | * 1/1928 | Reid | 301/108.1 |
| 1,835,950 | 12/1931 | Kay . | |
| 2,264,000 | * 11/1941 | McKechnie | 301/108.1 |
| 2,291,597 | * 8/1942 | Goeske | 301/108.1 |
| 3,955,852 | * 5/1976 | De Puydt et al. | 301/108.1 |
| 4,167,294 | * 9/1979 | Okazaki et al. | 301/108.1 |
| 4,183,587 | * 1/1980 | Spisak | 301/108.1 |
| 5,061,014 | 10/1991 | Polka . | |
| 5,112,112 | 5/1992 | Baba . | |
| 5,215,356 | * 6/1993 | Lin | 301/111 |
| 5,362,134 | 11/1994 | Carmona . | |
| 5,366,279 | 11/1994 | Polka . | |
| 5,413,378 | 5/1995 | Steffens, Jr. | 280/735 |
| 5,518,302 | 5/1996 | Bernoni . | |
| 5,785,347 | 7/1998 | Adolph et al. | 280/735 |
| 5,860,674 | 1/1999 | Corrado | 280/735 |
| 5,887,952 | * 3/1999 | Gandellini | 301/35.63 |
| 5,897,172 | * 4/1999 | Jarrell | 301/108.1 |

* cited by examiner

Primary Examiner—S. Joseph Morano
Assistant Examiner—Long Bao Nguyen
(74) Attorney, Agent, or Firm—Fulwider Patton Lee & Utecht, LLP

(57) ABSTRACT

Hub centric truck wheel cap apparatus including a cup shaped cap having a cylindrical wall configured with radially through windows. A set of spacer rings having lugs of different radial depths are provided for mating with the cap and projecting through such windows to form spacers in the annulus between selected wheels of different center bore diameters and a centering shoulder on a truck hub.

23 Claims, 2 Drawing Sheets

HUB CENTRIC TRUCK WHEEL CAP AND SPACER APPARATUS AND METHOD OF USING SAME

BACKGROUND OF THE INVENTION

1. Field of the Invention

The present invention relates to a device and method for centering truck wheels on a truck hub.

2. Description of the Prior Art

Concentric mounting of wheels on vehicle hubs have long been a concern in the marketplace. Much attention has been given to the concentric mounting of automotive wheels on the automotive hubs so as to minimize vibration of the wheels in operation and add to the comfort of the passenger. One such effort led to the proposal of a wheel having a recessed well configured with a center bore surrounded by lug bores and including a bushing device having a flat plate for overlying the lug bores and itself formed with matching bores, such plate being configured centrally with an integral cylindrical bushing to be received in the wheel bore to mate with the wheel hub. A separate flat plate cover was proposed for positioning in covering relationship over such bushing plate to be held in position by separate mounting screws. A device of this type is shown in U.S. Pat. No. 5,362,134 to Carmona. Devices of this type, while satisfactory for some automobile wheel applications, do not lend themselves to use on truck wheels having projecting grease hubs which themselves must be covered. Arrangements for facilitating hub centric mounting of automobile wheels does not generally lend itself to truck wheels since the physical mounting characteristics thereof are different. It is the problem of eccentric mounting of truck wheels to which this invention is directed.

Truck hubs are often formed with a hub arrangement having an axially projecting, cylindrical oil hub of about three to five inches in diameter and over which is received a hub cap positioned in covering relationship. Truck wheels are typically provided with a lug hole pattern of five, six or eight lugs arranged on a hole pattern concentric with a wheel center bore. The lugs pass through lug holes in such wheels concentric about a center bore through which the hub itself projects. The hub may be formed with a raised centering shoulder that might be matched with the bore of a particular wheel. However, the diameter of the center bores of various wheels often vary. Consequently, when wheels are mounted on hubs where the diameter of the bore does not correspond with the hub diameter or centering shoulder, the wheel might end up mounted slightly eccentric on the hub thus resulting in vibration when the truck is operated at certain speeds.

Efforts over the years to solve the problems associated with eccentric wheel mounting has included proposals that closed metal rings or plastic bushings be cemented to the wheel hub so as to reduce place between the hubs and axles. This solution is labor intensive and requires some degree of skill in achieving the appropriate setting.

Other methods proposed include the interpositioning between the axle and wheel of first and second rings of different diameters and then keying one to the axle and welding the rings together. Again, this is a labor intensive and high skill process.

It has also been proposed to provide a hub according to a maximum diameter of axles to be equipped with a ring to be interplaced between the hub and the wheel so as to occupy the annulus between the wheel and hub. A device of this type is shown in German Patent No. 3233807 filed Sep. 11, 1982. A drawback to this approach is that it employs an elastic ring which is relatively narrow and can give rise to instability.

Other efforts have led to a proposal that the inner wall of the wheel bore be configured with a land for receipt of selected ones of stepped bushings having various internal diameters and adapted to be locked in place by means of a split lock ring. A device of this type is shown in U.S. Pat. No. 5,518,302 to Bemoni. Devices of this type, while effective to improve concentricity, suffer the shortcoming that they are expensive to manufacture, difficult to mount and leave the axial outer end thereof exposed.

Various types of hub caps have been proposed for covering a truck wheel hub. One such hub cap is known as the push through cap. It is in the form of a cup shaped cap for fitting over the hub and is typically formed at its axially inner extremity with an outwardly turned flange to be captured under the chamfer around the center bore of the wheel.

Other truck hub caps have been proposed which fit telescopically over the truck hub but have adhesive material interposed between the cap wall and hub. A device of this type is shown in U.S. Pat. No. 5,366,279 to Polka. However, such caps are specific to particular diameters of hubs and do not have broad application for establishing concentricity of wheels relative to hubs.

SUMMARY OF THE INVENTION

The hub centric cap and spacer apparatus of the present invention is characterized by a cup shaped cap for telescoping over a wheel hub and formed with wheel windows aligned with the center bore of the wheel. A spacer ring selected for the particular hub and wheel on which the cap is to be mounted is configured with radial lugs spaced thereabout for projecting through such windows and be received in the annulus formed in such bore and the centering shoulder of the hub. In one configuration, such ring is formed with radially exterior splines defining such lugs spaced annularly to form between adjacent pairs of keyways which receive axially inwardly projecting fingers formed in the cap. The axially inner extremities of the lugs and fingers are then formed with radially outwardly turned retainer flanges which may be trapped under the chamfer of the wheel bore to hold the cap and selected spacer ring in position.

Other objects and features of the invention will become apparent from consideration of the following description taken in conjunction with the accompanying drawing.

DESCRIPTION OF THE PREFERRED EMBODIMENTS

Figure 1:
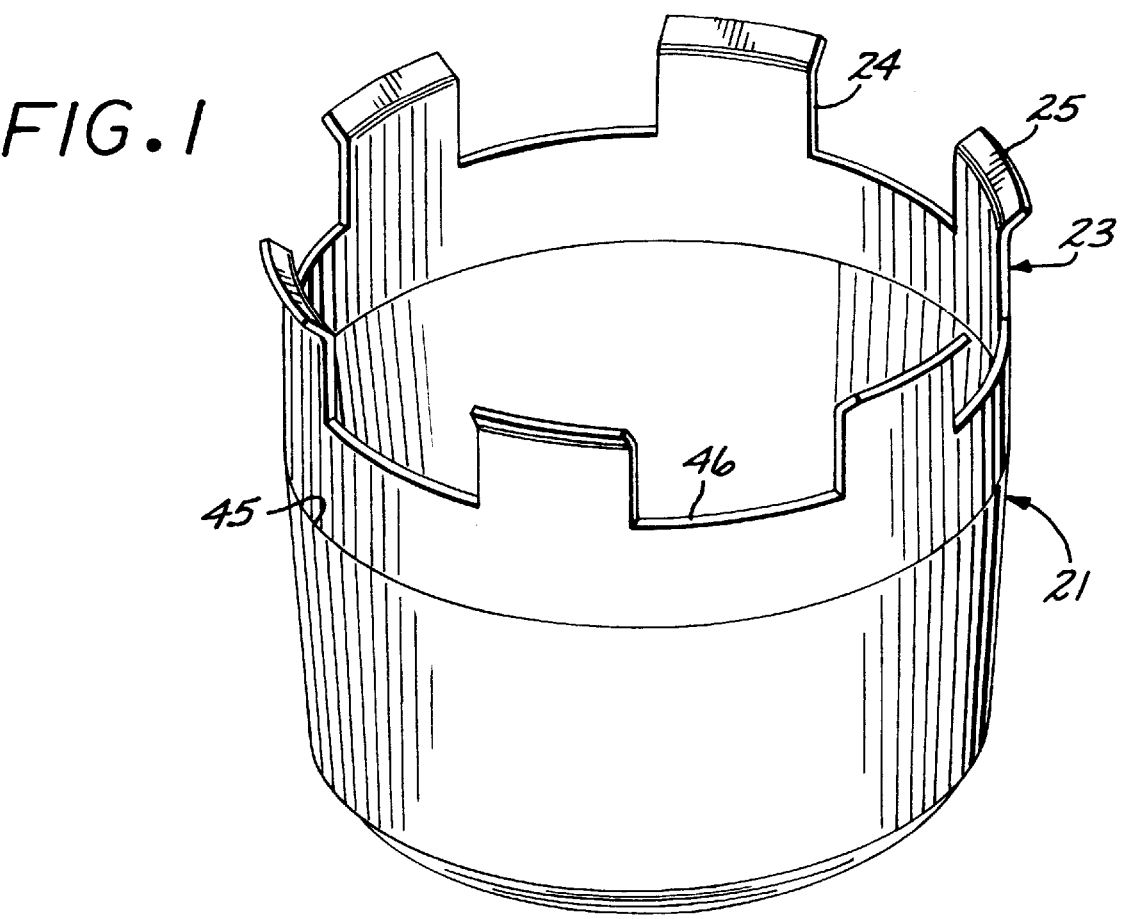
FIG. 1 is a perspective view of a hub cap incorporated in the hub centric truck wheel cap and main apparatus of the present invention.
Figure 2:
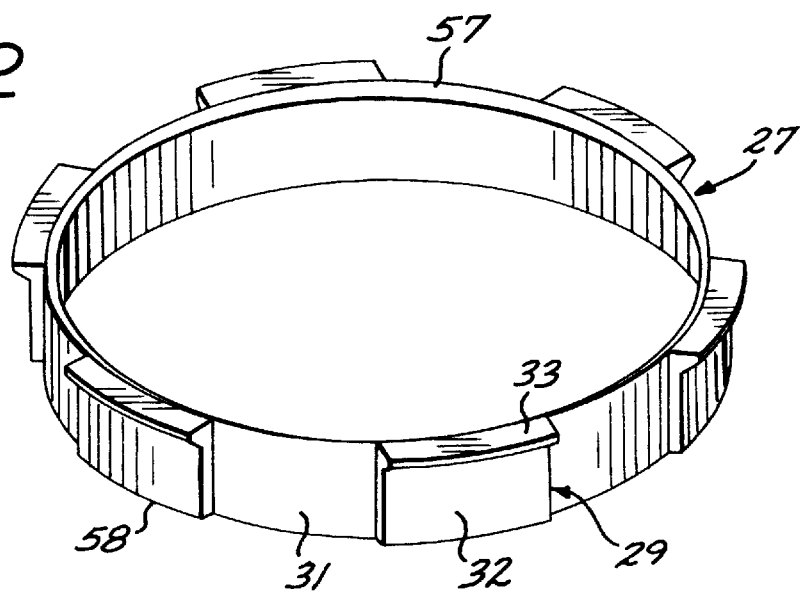
FIG. 2 is a perspective view of a spacer ring to be used with the cap shown in FIG. 1.
Figure 3:
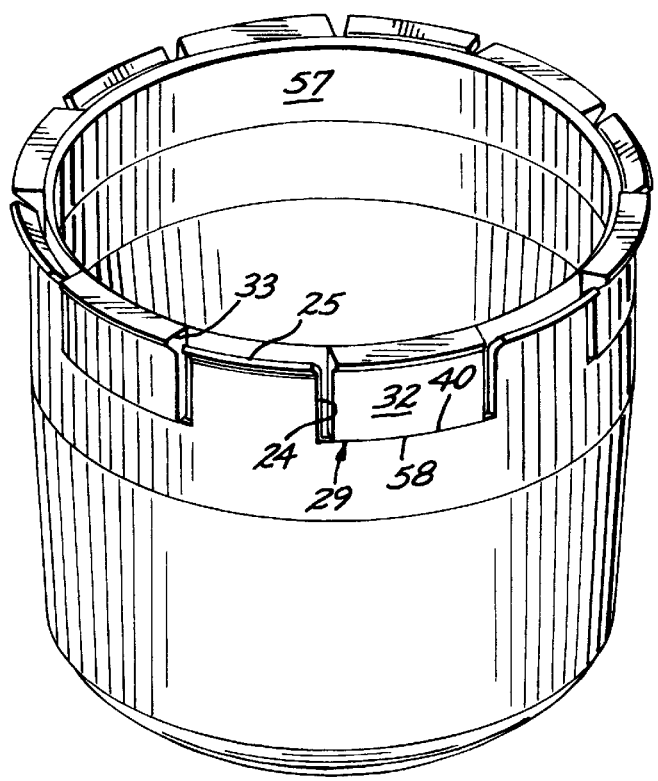
FIG. 3 is a perspective view of the spacer ring of FIG. 2 joined with the cap shown in FIG. 1.

Referring to FIGS. 1, 2 and 3, the hub centric truck cap and spacer apparatus of the present invention includes, generally, a cup-shaped cap 21 formed at its axially inner extremity with axial retainer fingers 23 disposed equidistant thereabout and formed on their respective inner extremities with retainer flanges 25. The cap 21 is sized for fitting over a hub of a selected diameter and to mate with spacer rings, generally designated 27, (FIG. 2) configured to be complementally registered in different diameter center bores 37 of different truck wheels. The spacer ring 27 includes respective raised longitudinal splines defining spacer lugs, generally designated 29, spaced apart annularly to form therebetween radial outwardly opening keyways 31. Such splines are formed on their distal extremities with radially outturned retainer flanges 33. Consequently, the spacer ring 27 and cap 21 may be assembled as shown in FIG. 3 and the cap pushed axially outwardly through the center bore 37 of the truck wheel, generally designated 39 (FIG. 4), to be retained in position for covering a truck hub and centered on a hub centering shoulder 30 for engaging the inner diameter of the ring 27.

Caps have long been known for covering the cylindrical hub of a truck hub assembly. Such caps are typically cup shaped and may be constructed of chrome plated plastic. Such caps 21 come in several different diameters and configuration for accommodating different combinations of wheels and hubs currently in use so as to facilitate centering of OEM wheels on existing truck hubs.

Figure 4:
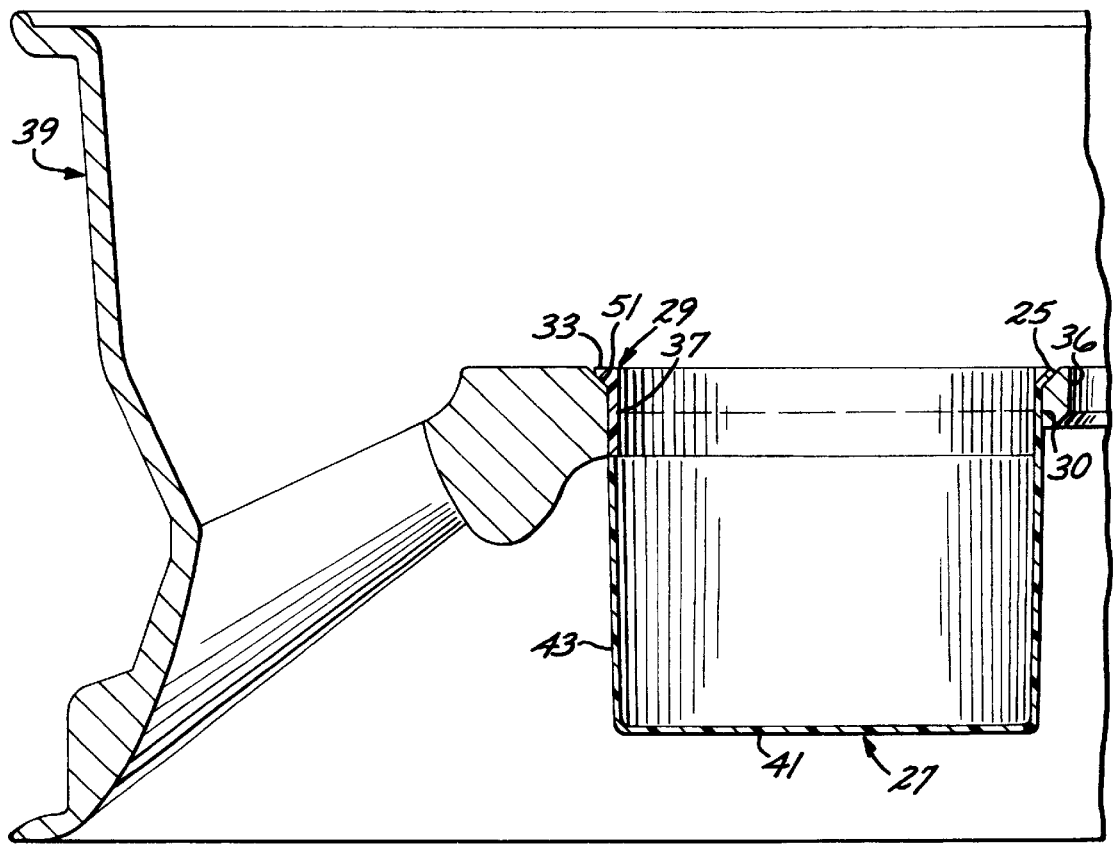
FIG. 4 is a sectional view, reduced in scale, of the hub centric truck cap apparatus of FIG. 3 shown mounted in a truck wheel.

The cap 21 of the present invention is sized to fit a selected hub and to mate with selected spacer rings 27 having different major diameters for accommodating different diameter wheel bores. Such cap is cup shaped to be formed with a circular end wall 41 and a cylindrical side wall 43 (FIG. 4). The side wall 43 may be slightly tapered and, in the preferred embodiment, is formed on its axially inner extremity with an exterior undercut defining an annular shoulder 45 (FIG. 1). In the exemplary embodiment shown, the cap is intended for use with a wheel 39 for mounting to a hub with six lugs but may be constructed to be utilized with truck wheels having any desired number of lugs, five, six, eight or more. The cap 21 is formed on its axially inner extremity with axially projecting, arcuate rectangularly shaped fingers 23 which are turned outwardly at the respective axial inner extremities to be formed with radially outwardly and axially inwardly angled retainer flanges 25. The retainer flanges 25 angle radially outwardly and axially inwardly at an angle of 45° to the axis to thus complement the angle of the interior chamfer 51 formed about the center bore 37 of the wheel 39 (FIG. 4). Such flange may be flexible so that, in use, they may be flexed into position trapped behind a chamfer 51 formed at the axial inner end of the wheel center bore (FIG. 4). Such fingers are spaced laterally apart to form therebetween rectangularly shaped clearance windows 24 (FIG. 1) for receipt of the respective splines 29 and configured at their respective axial outer ends with a respective annular wall 46 against which the axially inner ends of such splines 29 may abut (FIG. 3).

The cap 21 may be designed for any one of a number of different truck wheels having various different bores, such as centering bores of 3.72, 4.25 or 5.15 inches. The interior diameter of the cap 21 is thus configured to be slip fit through the bore 37 (FIG. 4) from the axially inner side thereof and engage the respective retainer flanges 25 in nesting relationship with the chamfer 51. It will be appreciated by those skilled in the art that the chamfer 51 may take many different shapes, it only being important that it form an axially inwardly facing retainer surface to engage the flanges 25.

The spacer ring 27 is constructed to be matingly engaged with the cap 21 and, in the preferred embodiment, is constructed to be received telescopically inwardly from the axially inner extremity, concentric within the fingers 23. To this end, the ring 27 is configured with a body in the form of an angular metal band 57 constructed integral with the respective splines 29, with such splines raising radially outwardly therefrom and projecting axially therewith. The splines 29 are formed as sectors of a cylindrical shell and are configured with a radial depth approximately equal to the annular space to be formed between the annular shoulder 30 of the hub and the wall of the bore 37 to thus serve to center the wheel 39 relative to the hub shoulder 30. Such splines are formed with cylindrical outer facets 32 having a radius approximately equal to that of the wheel bore to thus complementally abut thereagainst. Such splines are spaced annularly apart a distance slightly greater than the width of the fingers 23 for clip fit thereof.

As an example, for a 4.25 inch wheel bore, the radial thickness of the spline lugs 29, when combined with the thickness of the annular band 57, may be on the order of 0.12 inches. As will be apparent to those skilled in the art, the spacer rings 27 will be machined to a tolerance of approximately plus or minus 0.004 inches.

In practice, a truck service depot or supply house will stock a supply of caps 21 to be used with selected truck wheels and hub arrangements. A set of spacer rings 27 of having lugs 29 configured with the facets 32 configured to correspond with the circumference of a sector of a circle corresponding with the diameter of selected wheels will then also be stocked. Then, when a truck wheel is to be mounted, the cap 21 corresponding with that general range of wheel bore may be selected and a ring 27, having an ID and major OD corresponding with the annular space between the shoulder 30 of the hub and diameter of the bore 37 of the wheel to be mounted, may likewise be selected. The ring 27 may then be telescoped into the axially inner end of the cap 21 to nest the respective lug splines 29 in the respective windows 24 with the respective fingers 23 being received in the axial keyways 31, as shown in FIG. 3. It will be appreciated that, as the ring 27 is inserted into the cap 21, the axially inwardly facing retainer surfaces 58 will abut the cap retainer surface 46 to thus limit axial outward movement of the spacer ring 27 relative to the cap 21. In some constructions, as for example when the cap 21 is constructed of metal, this feature may be employed to retain the ring 27 within such cap. The assembled spacer ring and cap may then be passed axially outwardly through the bore 37 of the wheel 39 to nest the respective retainer flanges 25 and 33 (FIG. 4) on the chamfer 51. The assembled wheel and cap may then be mounted on the truck wheel and the wheel lugs being received in the lug holes 36 to mount the wheel securely to the hub assembly. It will be appreciated that the spacer ring 27 will thus serve to center the wheel on such shoulder 30 thereby positively securing a concentric relationship between such wheel and the hub to thereby minimize vibration.

For the purposes of the invention, the shoulder 30 may be any cylindrical surface on the hub which will provide structure for locating the wheel relative to the center of rotation for such hub.

It will be appreciated by those skilled in the art that the cap 21 and spacer ring 27 may take many different configurations. It is only important that the metal spacer ring 27 be constructed with the spline lugs 32 having a radial thickness sufficient to fill the annulus between the hub shoulder 30 and bore 37 of the wheel 39 to be mounted to such hub.

It will be apparent to those skilled in the art from this disclosure, the windows 24 may be of various different configurations and that, if desired, may be closed on the axially inner end with an annular band received in an annular groove formed in the lug splines 29. Additionally, if desired, the fingers 23 and inner flanges 25 of the cup 21 may be constructed so that there is sufficient flexibility thereof so that the fingers could be flexed radially inwardly so that the spacer ring 27 could be telescoped axially thereover with the lugs 29 projecting radially inwardly from the band 57.

From the foregoing, it will be apparent that the device of the present method provides an effective and economical method for centering truck wheels having center bores of a variety of diameters on truck hubs employing a single or minimal models of hub caps.

Various modifications and changes may be made with regard to the foregoing detailed description without departing from the spirit of the invention.

What is claimed is:

1. Hub centric truck wheel cap and spacer apparatus engaging an axially inwardly facing retainer surface in an annulus formed between a center bore of a truck wheel having an axially inwardly facing retainer surface and a truck hub and comprising:
    an axially projecting cylindrical cup shaped hub cap formed on its axial inner extremity with at least one radially outwardly turned cap retainer flange for engaging behind said retainer surface, said cap further including radial clearance windows spaced circumferentially thereabout; and
    a spacer ring constructed to be removably received in concentric relationship with said cap, said ring formed on its outer diameter with a retainer for retaining said ring in axial spaced relationship relative to said wheel, and spacer lugs spaced circumferentially therearound for receipt in said annulus for projecting radially through said windows and formed with respective radially outwardly facing bearing facets to engage with said axially inwardly facing retainer surface in said bore.

2. Hub centric truck wheel cap and spacer apparatus of claim 1 wherein:
    said cap is constructed of plastic.

3. Hub centric truck wheel cap and spacer apparatus of claim 1 wherein:
    said cap is formed on its axially inner end with radially out turned flanges to engage behind said wheel.

4. Hub centric truck wheel cap and spacer apparatus of claim 1 wherein:
    said spacer ring is configured to be received telescopically in said cap.

5. Hub centric truck wheel cap and spacer apparatus of claim 1 wherein:
    said cap is formed with a plurality of retainer fingers spaced circumferentially thereabout to be formed therebetween with said windows, said fingers being formed on their respective axially inner extremities with flange segments cooperating to form said retainer flange.

6. Hub centric truck wheel cap and spacer apparatus of claim 1 wherein:
    said spacer ring is constructed of metal.

7. Hub centric truck wheel cap and spacer apparatus of claim 1 wherein:
    said cap is configured with a plurality of retainer cap flange segments spaced equidistant therearound and spaced annularly apart to form therebetween clearance openings; and
    said spacer ring includes a plurality of ring retainer flange segments interposed between the said cap flange segments.

8. Hub centric truck wheel cap and spacer apparatus of claim 1 wherein: said retainer cap is constructed such that said retainer flange is frusto conically shaped, resembling a truncated cone.

9. Hub centric truck wheel cap and spacer apparatus of claim 1 wherein:
    said ring is formed on its radial exterior with axial splines spaced radially apart to form therebetween axial key ways; and
    said cap is formed with axial fingers configured for complemental receipt in the respective said key ways.

10. Hub centric truck wheel cap and spacer apparatus of claim 1 wherein:
    said lugs are formed with said bearing surfaces configured to form sectors of a circle having a diameter of substantially 3.70 inches.

11. Hub centric truck wheel cap and spacer apparatus of claim 1 wherein:
    said lugs are formed with said bearing surfaces configured to form sectors of a circle having a diameter of substantially 4.24 inches.

12. Hub centric truck wheel cap and spacer apparatus of claim 1 wherein:
    said lugs are formed with said bearing surfaces configured to form sectors of a circle having a diameter of substantially 5.14 inches.

13. Hub centric truck wheel cap and spacer apparatus of claim 1 wherein:
    said cap includes a plurality of retainer fingers having axial outer extremities spaced equidistant thereabout to form therebetween said windows and including at said axially outer extremities of the said respective retainer fingers respective retainer flange segments to be received against said retainer surface.

14. Hub centric truck wheel cap and spacer apparatus of claim 13 wherein:
    said spacer ring is formed with splines received in said windows.

15. Hub centric truck wheel cap and spacer apparatus of claim 1 for mounting truck wheel of the type that includes a chamfer on the back side of said bore and wherein:
    said retainer is configured to complementally engage said chamfer.

16. Hub centric truck wheel cap and spacer apparatus of claim 7 for use in mounting said wheel of the type that includes a chamfer on the back side of said bore and wherein:
    said cap and ring retainer segments are configured to complement the shape of said chamfer and are formed to be received therebehind.

17. A method of mounting a truck hub having a center bore of a predetermined diameter to a hub having a centering shoulder of a selected diameter smaller than said predetermined diameter and including:
    selecting a hub cap for covering said hub and configured to project inwardly through said bore and formed with at least one radially outwardly projecting retainer flange;
    selecting a retainer ring configured to be mated with said cap and having radially projecting splines configured to be received in said windows positioned in the annulus formed between said shoulder and said bore to center a wheel on said shoulder;

mating said selected spacer ring with said cap; and assembling said cap on said wheel by pushing said cap through said bore.

18. A method as set forth in claim 17 that includes:

selecting said cap constructed of plastic.

19. A method as set forth in claim 17 that includes:

selecting a set of said spacer rings constructed for mating with said cap and with selected wheels having selected different center bore diameters.

20. A method as set forth in claim 17 that includes:

selecting said cap and spacer ring each formed with retainer flanges and that include:

positioning said retainer flanges on a chamfer on the axially inner side of said bore.

21. A method as set forth in claim 17 which includes:

machining said retainer ring to a radial dimension closely fitting said annulus between said shoulder and said bore.

22. Hub centric truck wheel spacer ring for mating with a cylindrical cup shaped hub cap, said hub cap being formed on its axial inner extremity with at least one radially outwardly turned cap retainer flange for engaging behind a chamfer and having radial clearance windows spaced circumferentially thereabout to engage in an annulus formed between the center bore of a truck wheel having an axially inwardly facing chamfer and the hub of said truck wheel and comprising:

a spacer ring constructed to be removably received in concentric relationship with said cap, said ring formed on its axially outer end with a retainer for retaining said ring in axial spaced relationship relative to said wheels, and spacer lugs spaced circumferentially therearound for receipt in said annulus for projecting radially through said windows and formed with respective radially outwardly facing bearing facets to engage with said axially inwardly facing retainer surface in said bore.

23. Hub centric truck wheel cap and spacer apparatus comprising:

a truck wheel formed with a center bore for receipt of a truck hub to cooperate in forming an annulus and configured with an axially inwardly facing chamfer circumscribing said bore and formed with an axially inwardly facing retainer surface;

an axially projecting cylindrical cup shaped hub cap formed on its axial inner extremity with a radially outwardly turned cap retainer flange for engaging behind said chamfer, said cap further including radial clearance windows spaced circumferentially thereabout; and an axially elongated spacer ring constructed to be removably received in concentric relationship with said cap, said ring formed on its axially inner end with a retainer for retaining said ring in axial spaced relationship relative to said wheel and spacer lugs spaced circumferentially therearound for receipt in said annulus for projecting radially through said windows and formed with respective radially outwardly facing bearing facets to engage with said axially inwardly facing retainer surface.

* * * * *